(12) United States Patent
Wu et al.

(10) Patent No.: US 10,506,419 B2
(45) Date of Patent: Dec. 10, 2019

(54) RELAY SELECTION METHOD AND APPARATUS AND SYSTEM

(71) Applicant: FUJITSU LIMITED, Kawasaki-shi, Kanagawa (JP)

(72) Inventors: Lianhai Wu, Beijing (CN); Haibo Xu, Beijing (CN); Hua Zhou, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/891,853

(22) Filed: Feb. 8, 2018

(65) Prior Publication Data

US 2018/0160287 A1 Jun. 7, 2018

Related U.S. Application Data

(63) Continuation of application No. PCT/CN2015/086968, filed on Aug. 14, 2015.

(51) Int. Cl.
*H04W 8/00* (2009.01)
*H04W 4/06* (2009.01)
(Continued)

(52) U.S. Cl.
CPC ........ *H04W 8/005* (2013.01); *H04B 7/15507* (2013.01); *H04B 7/2606* (2013.01);
(Continued)

(58) Field of Classification Search
CPC ..... H04W 88/04; H04W 8/005; H04W 24/10; H04W 36/0005; H04W 36/30; H04B 7/15507; H04B 7/2606
See application file for complete search history.

(56) References Cited

U.S. PATENT DOCUMENTS

2010/0167743 A1  7/2010  Palanki et al.
2012/0170508 A1*  7/2012  Sawai .................... H04B 7/155
                                                              370/315

(Continued)

FOREIGN PATENT DOCUMENTS

CN      102469410 A     5/2012
CN      104168629 A    11/2014

OTHER PUBLICATIONS

International Search Report issued for corresponding International Patent Application No. PCT/CN2015/086968, dated May 23, 2016, with an English translation.

(Continued)

*Primary Examiner* — Phirin Sam
*Assistant Examiner* — Debebe A Asefa
(74) *Attorney, Agent, or Firm* — Myers Wolin, LLC

(57) ABSTRACT

Embodiments of this disclosure provide a relay selection method and apparatus and a system. The method includes: relay equipment broadcasts relay discovery information, the relay discovery information including identifier information (a relay UE ID) of the relay equipment and identifier information (a cell ID) of a serving cell of the relay equipment, so that remote terminal receiving the relay discovery information selects relay equipment according to the relay discovery information or transmits relay information of discovered relay equipment to an eNB, thus the eNB may select relay equipment for the remote terminal. With the embodiments of this disclosure, the serving cell may learn a cell where a relay to which the terminal accesses is located, so as to perform configuration for the terminal or perform path switching of downlink data.

18 Claims, 9 Drawing Sheets

(51) Int. Cl.
  *H04B 7/155* (2006.01)
  *H04B 7/26* (2006.01)
  *H04W 8/24* (2009.01)
  *H04W 48/16* (2009.01)
  *H04W 88/04* (2009.01)

(52) U.S. Cl.
  CPC ............... *H04W 4/06* (2013.01); *H04W 8/24* (2013.01); *H04W 48/16* (2013.01); *H04W 88/04* (2013.01)

(56) References Cited

U.S. PATENT DOCUMENTS

2013/0016630 A1   1/2013   Bhushan et al.
2016/0286471 A1*  9/2016   Zisimopoulos ....... H04W 48/16

OTHER PUBLICATIONS

Written Opinion of the International Searching Authority issued for corresponding International Patent Application No. PCT/CN2015/086968, dated May 23, 2016, with an English translation.

\* cited by examiner

RELAY SELECTION METHOD AND APPARATUS AND SYSTEM

CROSS REFERENCE TO RELATED APPLICATIONS

This application is a continuation application of International Application PCT/CN2015/086968 filed on Aug. 14, 2015, the entire contents of which are incorporated herein by reference.

FIELD

This disclosure relates to the field of communication technologies, and in particular to a relay selection method and apparatus and a system.

BACKGROUND

A sidelink communication mode refers to that a packet needs not to pass a core network and a base station, and a communication link may be directly established between UE1 and UE2 for communication. And a discovery process is generally performed before sidelink communication is performed. For example, UE2 needs first to discover whether UE1 is near before transmitting information to UE1 in the sidelink communication mode. FIG. 1 is a schematic diagram of discovery or sidelink communication establishment by two UEs which are both under coverage of an eNB. FIG. 2 is a schematic diagram of discovery or sidelink communication establishment by one UE under coverage of an eNB and another UE not under the coverage of the eNB. And FIG. 3 is a schematic diagram of discovery or sidelink communication establishment by two UEs which are not under coverage of an eNB.

The sidelink communication mode may be used to expand coverage of a cell. As shown in FIG. 1, UE2 is located at an edge of a cell, and the signals received by it are relatively weak, thus it is very possible to that the UE2 will leave the coverage of the cell. Furthermore, there exists a terminal nearby which is authorized by a network and has a function of relay, referred to as a relay, such as UE1. And in order to avoid traffic interruption, UE2 may access to a base station via the relay UE1 after discovering the relay UE1, and proceed with performing normal traffic communication. As shown in FIG. 2, UE2 is located in an area with no network coverage, and there exists a terminal nearby which is authorized by a network and has a function of relay, such as UE1. And in order to access to a network for communication, UE2 may access to a base station via the relay UE1 in coverage of the cell after discovering the relay UE1, and proceed with performing normal traffic communication.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In the description of the above scenarios, UE2 is referred to as remote terminal (remote UE), which is possibly located in coverage of a cell, or may be located out of coverage of a cell. The terminal having a function of relay, such as UE1, is referred to as a UE-network relay, and briefly referred to as a relay in this application.

If a terminal discovers more than two relays, as shown in FIG. 4, the terminal is unable to learn which cell the discovered relay belongs to, and when the terminal transfers cellular data to a relay in a neighboring cell, a serving cell needs to perform necessary configuration to the terminal, and path switching of downlink data needs to be performed. Therefore, it is necessary for the serving cell to learn a cell where a relay to which the terminal accesses is located, that is, whether the relay is located in the own serving cell (itself) or a neighboring cell.

In order to solve the above problem, embodiments of this disclosure provide a relay selection method and apparatus and a system.

According to a first aspect of the embodiments of this disclosure, there is provided a relay selection method, applicable to relay equipment, the method including:

broadcasting relay discovery information, the relay discovery information including identifier information (a relay UE ID) of the relay equipment and identifier information (a cell ID) of a serving cell of the relay equipment.

According to a second aspect of the embodiments of this disclosure, there is provided a relay selection method, applicable to a remote terminal, the method including:

receiving relay discovery information transmitted by relay equipment, the relay discovery information including identifier information (relay UE IDs) of the relay equipment and identifier information (a cell IDs) of serving cells of the relay equipment;

measuring sidelink channel quality for discovered relay equipment; and determining relay equipment of the remote terminal based on a measurement result.

According to a third aspect of the embodiments of this disclosure, there is provided a relay selection method, applicable to an eNB, the method including:

receiving relay information transmitted by a remote terminal, the relay information including an ID of a serving cell of relay equipment discovered by the remote terminal; and determining relay equipment of the remote terminal according to the received relay information.

According to a fourth aspect of the embodiments of this disclosure, there is provided a relay selection apparatus, applicable to relay equipment, the apparatus including:

a broadcasting unit configured to broadcast relay discovery information, the relay discovery information including identifier information (a relay UE ID) of the relay equipment and identifier information (a cell ID) of a serving cell of the relay equipment.

According to a fifth aspect of the embodiments of this disclosure, there is provided a relay selection apparatus, applicable to a remote terminal, the apparatus including:

a receiving unit configured to receive relay discovery information transmitted by relay equipment, the relay discovery information including identifier information (relay UE IDs) of the relay equipment and identifier information (cell IDs) of serving cells of the relay equipment;

a measuring unit configured to measure sidelink channel quality for discovered relay equipment; and a selecting unit configured to determine relay equipment of the remote terminal based on a measurement result.

According to a sixth aspect of the embodiments of this disclosure, there is provided a relay selection apparatus, applicable to an eNB, the apparatus including:

a receiving unit configured to receive relay information transmitted by a remote terminal, the relay information including an ID of a serving cell of relay equipment discovered by the remote terminal; and a determining unit configured to determine relay equipment of the remote terminal according to the relay information received by the receiving unit.

According to a seventh aspect of the embodiments of this disclosure, there is provided a communication system, including the relay equipment as described in the fourth aspect, the remote terminal as described in the fifth aspect and the eNB as described in the sixth aspect.

An advantage of the embodiments of this disclosure exists in that with the embodiments of this disclosure, the serving cell may learn a cell where a relay to which the terminal accesses is located, so as to perform configuration for the terminal and perform path switching of downlink data.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the exemplary embodiments of the present disclosure, and are used for setting forth the principles of the present disclosure together with the description. It is clear and understood that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Various embodiments of this disclosure shall be described below with reference to the accompanying drawings. These embodiments are illustrative only, and are not intended to limit this disclosure.

Embodiment 1

Figure 1:
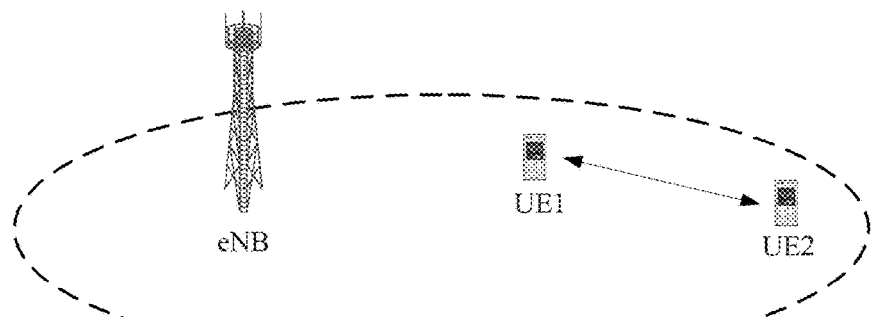
FIG. 1 is a schematic diagram of a scenario of discovering or establishing a sidelink.
Figure 2:
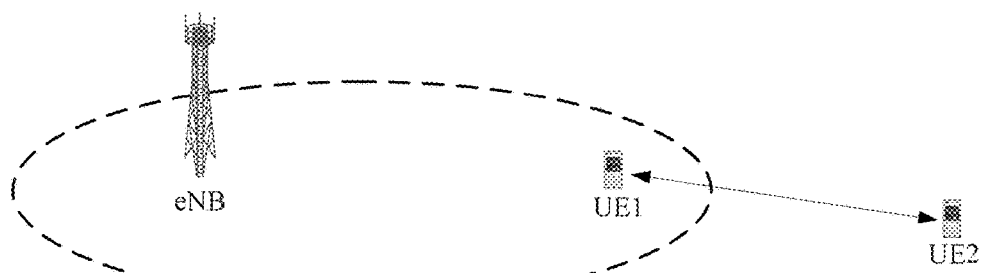
FIG. 2 is a schematic diagram of another scenario of discovering or establishing a sidelink.
Figure 3:
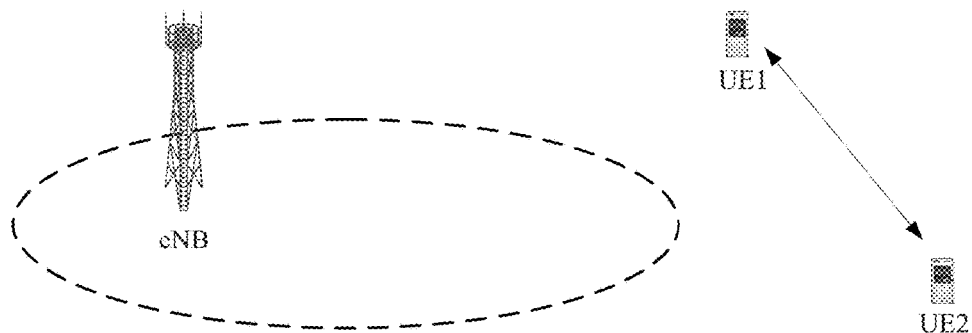
FIG. 3 is a schematic diagram of a further scenario of discovering or establishing a sidelink.
Figure 4:
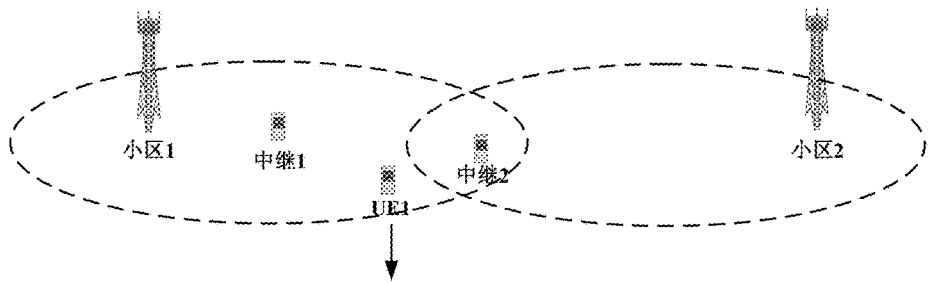
FIG. 4 is a schematic diagram of still another scenario of discovering or establishing a sidelink.
Figure 5:
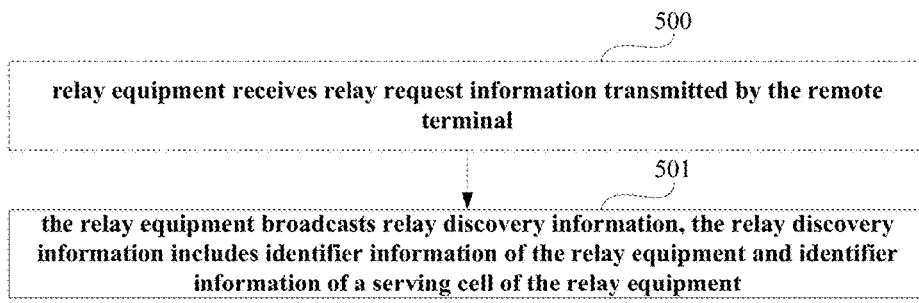
FIG. 5 is a flowchart of a relay selection method of Embodiment 1.

The embodiment of this disclosure provides a relay selection method, applicable to relay equipment, such as a terminal equipment in coverage of a cell. In this embodiment, an eNB configures the terminal equipment to be a relay via broadcast signaling or via specific signaling, and with a discovery mechanism, the terminal equipment may be selected by a remote terminal as a relay, and function as relay equipment of the remote terminal. FIG. 5 is a flowchart of the method. Referring to FIG. 5, the method includes:

step 501: the relay equipment broadcasts relay discovery information, the relay discovery information includes identifier information of the relay equipment and identifier information of a serving cell of the relay equipment.

In this embodiment, the identifier information of the relay equipment is, for example, a relay UE ID, and the identifier information of a serving cell of the relay equipment is, for example, a cell identifier (ID) of the serving cell of the relay equipment, i.e. a cell ID; wherein, the cell ID may use an existing ECGI (E-UTRAN (evolved UMTS (universal mobile telecommunications system) terrestrial radio access network) cell global identifier), a PCI (physical cell identifier), or other IDs identifying cells.

In one implementation, the relay equipment may transmit the above relay discovery information autonomously, and in another implementation, the relay equipment may transmit the above relay discovery information after receiving a request from the remote terminal, in this implementation, as shown in FIG. 5, the method may further include:

step 500: the relay equipment receives relay request information transmitted by the remote terminal.

With the method of this embodiment, after being triggered to perform relay reselection or selection, the remote terminal may start to receive the above relay discovery information, and further discover near relay equipment, details being going to be described in subsequent embodiments. As the relay discovery information contains the identifier of the serving cell of the relay equipment, it is advantageous for the eNB to perform necessary configuration for the remote terminal or perform path switching of downlink data.

Embodiment 2

Figure 6:
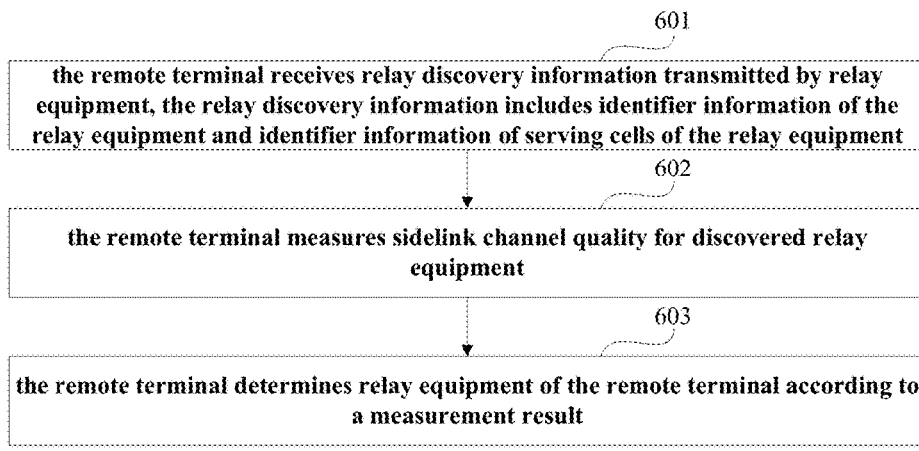
FIG. 6 is a flowchart of a relay selection method of Embodiment 2.

The embodiment of this disclosure provides a relay selection method, applicable to a remote terminal, which is processing at a remote terminal side corresponding to the method of Embodiment 1, with contents identical to those in Embodiment 1 being not going to be described any further. The remote terminal may be in coverage of a cell, or may be out of coverage of a cell, and may discover a relay via sidelink transmission. FIG. 6 is a flowchart of the method. Referring to FIG. 6, the method includes:

step 601: the remote terminal receives relay discovery information transmitted by relay equipment, the relay discovery information includes identifier information of the relay equipment and identifier information of serving cells of the relay equipment;

wherein, the relay discovery information has been described in Embodiment 1, and shall not be described herein any further; and after being triggered to perform relay reselection or selection, the remote terminal may start to receive the relay discovery information, and further discover near relay equipment;

step 602: the remote terminal measures sidelink channel quality for discovered relay equipment; and step 603: the remote terminal determines relay equipment of the remote terminal based on a measurement result.

In this embodiment, as the relay discovery information contains the identifier information of the serving cells of the relay equipment, for a remote terminal in coverage of a cell, it may measure sidelink channel quality for all discovered relay equipment, and select appropriate relay equipment therefrom, or may report the sidelink channel quality to an eNB, and the eNB selects appropriate relay equipment for it; or it may only measure sidelink channel quality for discovered relay equipment in the same serving cell as the remote terminal, and select appropriate relay equipment therefrom, or may report the sidelink channel quality to an eNB, and the eNB selects appropriate relay equipment for it. For a remote terminal out of coverage of the cell, it may measure sidelink channel quality for discovered relay equipment in the same serving cell as a serving relay of the remote terminal, and select appropriate relay equipment therefrom; or it may measure sidelink channel quality for all discovered relay equipment, reselect appropriate relay equipment therefrom autonomously, and report relay information on the reselected relay equipment to a serving cell (an eNB) via the serving relay, particular implementations being going to be described later.

In a scenario of this embodiment, relay equipment in a neighboring cell is not selected as a relay. The method of this embodiment shall be described below with reference to a number of implementations in such a scenario.

Figure 7:
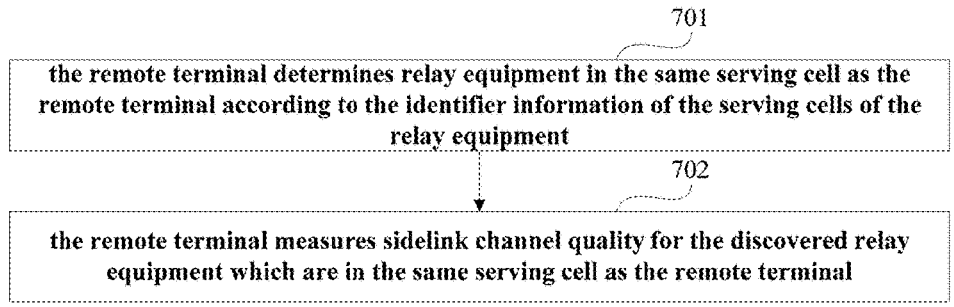
FIG. 7 is a flowchart of an implementation of measuring sidelink channel quality for a discovered relay equipment in the relay selection method of Embodiment 2.

In one implementation, for the remote terminal in the coverage of the cell, as shown in FIG. 7, step 602 includes:

step 701: the remote terminal determines relay equipment in the same serving cell as the remote terminal according to the identifier information of the serving cells of the relay equipment; and step 702: the remote terminal measures sidelink channel quality for the discovered relay equipment which are in the same serving cell as the remote terminal.

In this implementation, according to the cell IDs contained in the relay discovery information, i.e. the IDs of the serving cells of the relay equipment, the remote terminal is able to distinguish which discovered relay equipment are in the same serving cell as itself, and only measures sidelink channel quality for the discovered relay equipment in the same serving cell as itself.

In this implementation, the remote terminal may select appropriate relay equipment from the discovered relay equipment in the same serving cell as the remote terminal based on a measurement result and with reference to other information, such as a load, battery remaining, and an assisting amount, etc., and take it as a relay of itself. Therefore, the remote terminal may report relay information on the selected relay equipment to the eNB, and the relay information may include an ID of the selected relay equipment. After receiving the relay information, the eNB may feed back acknowledgment information to the remote terminal, so as to confirm the relay equipment selected by the remote terminal.

In this implementation, the remote terminal may also transmit the measurement result to the eNB, and the eNB selects appropriate relay equipment for it. For example, the remote terminal may report relay information on relay equipment in the same serving cell as the remote terminal to the eNB, the relay information containing an IDs of the relay equipment in the same serving cell as the remote terminal and a measurement result. Based on the measurement result, the eNB may help the remote terminal to select appropriate relay equipment and inform the remote terminal. Therefore, the remote terminal may take the relay equipment selected by the eNB for it as its relay equipment.

Figure 8:
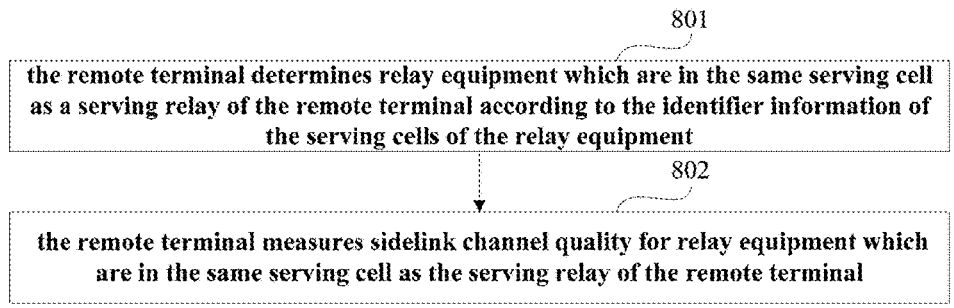
FIG. 8 is a flowchart of another implementation of measuring sidelink channel quality for a discovered relay equipment in the relay selection method of Embodiment 2.

In another implementation, for the remote terminal out of the coverage of the cell, as shown in FIG. 8, step 602 includes:

step 801: the remote terminal determines relay equipment which are in the same serving cell as a serving relay of the remote terminal according to the identifier information of the serving cells of the relay equipment; and step 802: the remote terminal measures sidelink channel quality for relay equipment which are in the same serving cell as the serving relay of the remote terminal.

In this implementation, according to the cell IDs contained in the relay discovery information, i.e. the IDs of the serving cells of the relay equipment, the remote terminal is able to distinguish which discovered relay equipment are in the same serving cell as the serving relay of itself, and only measures sidelink channel quality for the discovered relay equipment in the same serving cell as the serving relay of itself.

In this implementation, the remote terminal may select appropriate relay equipment from the discovered relay equipment in the same serving cell as the serving relay of itself based on a measurement result and with reference to other information, such as those described above, and take it as a relay of itself. Therefore, the remote terminal may report relay information on the selected relay equipment to its serving relay, and its serving relay forwards the relay information to the serving cell (the eNB); wherein, the relay information may include an ID of the selected relay equipment. After receiving the relay information, the eNB may feedback acknowledgment information to the serving relay, and the serving relay forwards the acknowledgment information to the remote terminal, so as to confirm the relay equipment selected by the remote terminal.

In another scenario of this embodiment, relay equipment in a neighboring cell may be selected as a relay. The method of this embodiment shall be described below with reference to a number of implementations in such a scenario.

In one implementation, for the remote terminal in the coverage of the cell, what is measured by it is sidelink channel quality for all discovered relay equipment.

In this implementation, the remote terminal may select appropriate relay equipment from all the discovered relay equipment based on the measurement result and with reference to other information, such as those described above, take it as a relay of itself and report the relay information on the selected relay equipment to the eNB; wherein, the relay information may include an ID of the selected relay equipment and the ID of the serving cell of the relay equipment.

In this implementation, the remote terminal may also report the measurement result to the eNB, and the eNB selects appropriate relay equipment for it. For example, the remote terminal reports the relay information on all the discovered relay equipment to the eNB, the relay information containing IDs of all the discovered relay equipment, measurement results corresponding to the individual relay equipment and the IDs of the serving cells of the relay equipment. Based on the measurement results, the eNB may help the remote terminal to select appropriate relay equipment. Therefore, the remote terminal may take the relay equipment selected by the eNB for it as its relay equipment.

In this implementation, as it is possible that the selected relay equipment (which is selected by the remote terminal itself or selected by the eNB for it) and the remote terminal are in the same serving cell, or in different serving cells, processing at an eNB side shall be described in Embodiment 3.

In another implementation, for the remote terminal out of the coverage of the cell, what is measured by it is also sidelink channel quality for all discovered relay equipment. And what is different from the previous implementation is that as the remote terminal is out of the coverage of the cell and has no serving cell, it may select appropriate relay equipment from all the discovered relay equipment based on the measurement result and with reference to other information (such as those described above), take it as relay equipment of itself and transmit the relay information on the selected relay equipment to the serving relay of itself, and the relay information on the selected relay equipment may be transmitted to the serving cell (the eNB) via the serving relay of itself; wherein, the relay information may include the ID of the selected relay equipment and the ID of the serving cell of the relay equipment.

Figure 9:
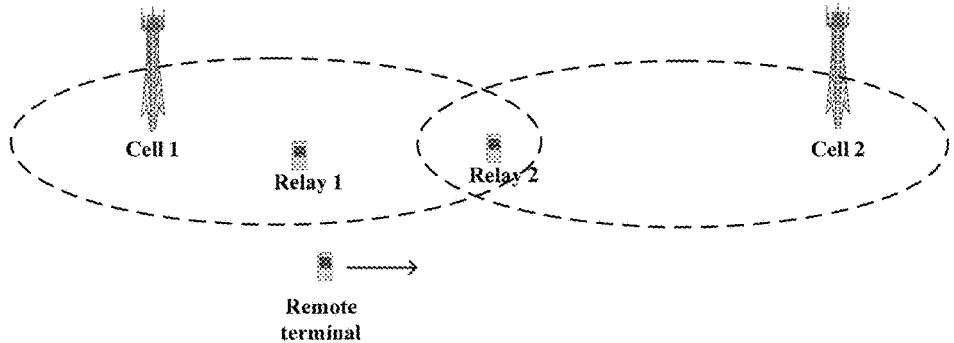
FIG. 9 is a schematic diagram of selecting a relay by a remote terminal out of coverage of a cell.

FIG. 9 is a schematic diagram of a process of selecting a relay by the remote terminal out of the coverage of the cell of this implementation. As shown in FIG. 9, it is assumed that the remote terminal out of the coverage of the cell is connected to a relay 1, and as the remote terminal moves rightward, it becomes closer to a relay 2 in a neighboring cell. In a process of relay reselection, the remote terminal will reselect relay equipment autonomously, and in the example in FIG. 9, the remote terminal will reselect the relay 2, and transmit relay information on the reselected relay equipment (the relay 2) to a serving cell (a cell 1) via the relay 1, the relay information may include an ID of the relay 2 and an ID of a serving cell (a cell 2) of the relay 2.

In this example, likewise, as it is possible that the selected relay equipment (which is selected by the remote terminal itself) and the serving relay of the remote terminal are in the same serving cell, or in different serving cells, the processing at the eNB side shall be described in Embodiment 3.

With the method of this embodiment, the remote terminal may select an appropriate relay, and the eNB may perform necessary configuration for the remote terminal or perform path switching of downlink data according to the serving cell of the selected relay equipment.

Embodiment 3

Figure 10:
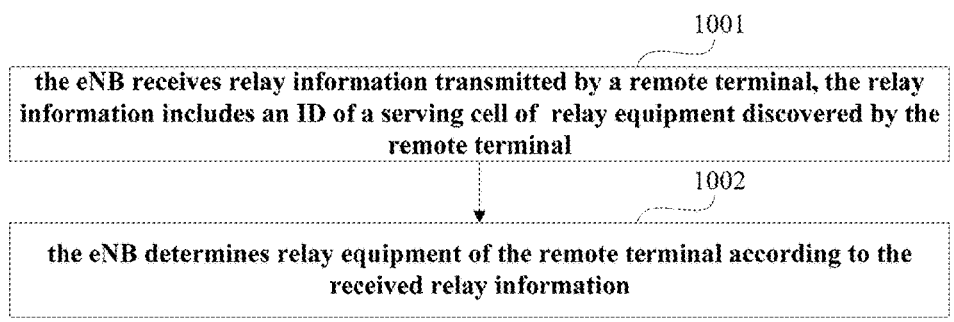
FIG. 10 is a flowchart of a relay selection method of Embodiment 3.

The embodiment of this disclosure provides a relay selection method, applicable to an eNB, which is processing at an eNB side corresponding to the methods of embodiments 1 and 2, with contents identical to those in embodiments 1 and 2 being not going to be described any further. FIG. 10 is a flowchart of the method. Referring to FIG. 10, the method includes:

step 1001: the eNB receives relay information transmitted by a remote terminal, the relay information includes an ID of a serving cell of relay equipment discovered by the remote terminal; and step 1002: the eNB determines relay equipment of the remote terminal according to the received relay information.

In one implementation of this embodiment, the relay information may include an ID of relay equipment selected by the remote terminal from the discovered relay equipment and an ID of a serving cell of the selected relay equipment.

In this implementation, the terminal selects one relay equipment from the discovered relay equipment.

In this implementation, if the relay equipment selected by the remote terminal and the remote terminal belong to the same serving cell, the eNB may feed back acknowledgment information to the remote terminal, so as to confirm the relay equipment selected by the remote terminal.

In this implementation, if the relay equipment selected by the remote terminal and the remote terminal belong to the same eNB but does not belong to the same serving cell, the eNB may first execute a handover process within the eNB, that is, handing the remote terminal over to the serving cell of the relay equipment selected by it, and then feed back acknowledgment information to the remote terminal, so as to confirm the relay equipment selected by the remote terminal. In this implementation, the handover process may be achieved via reconfiguration signaling, and this embodiment is not limited thereto.

In this implementation, if the relay equipment selected by the remote terminal and the remote terminal belong to different eNBs, the eNB (a receiving eNB, i.e. a source eNB) may first execute a procedure of handover between the eNBs, that is, handing the remote terminal over to an eNB (a target eNB) of the relay equipment selected by it. During the handover, the source eNB will forward relay information on the relay equipment selected by the remote terminal to the target eNB, and the target eNB feeds back acknowledgment information to the remote terminal based on information received from the source eNB, so as to confirm the relay equipment selected by the remote terminal.

In this implementation, the eNB may complete the above handover by transmitting a handover request message to the target eNB. The handover request message may include the relay information reported by the remote terminal, and alternatively, it may further include a new cause, which is used to denote that a cause of the handover is because the selected relay equipment is in the target eNB. In this implementation, the new cause may be relay selection, or relay reselection, or other expressions denoting the cause.

In another implementation of this embodiment, the relay information may include: an IDs of relay equipment discovered by the remote terminal, a measurement result of the discovered relay equipment and IDs of serving cells of the discovered relay equipment.

In this implementation, the eNB may select relay equipment for the remote terminal from the relay equipment discovered by the remote terminal according to the relay information.

In this implementation, if the selected relay equipment and the remote terminal belong to the same serving cell, the eNB may notify the remote terminal of relay information on the relay equipment selected for it, the relay information may include an ID of the relay equipment selected for the remote terminal.

In this implementation, if the selected relay equipment and the remote terminal belong to the same eNB but does not belong to the same serving cell, the eNB may first execute a handover procedure within the eNB, that is, handing the remote terminal over to the serving cell of the selected relay equipment, and then notify the remote terminal of relay information on the relay equipment selected for it, the relay information may include an ID of the relay equipment selected for the remote terminal. In this implementation, the handover procedure may be achieved via reconfiguration signaling, and this embodiment is not limited thereto.

In this implementation, if the relay equipment selected by the eNB and the remote terminal belong to different eNBs, or the eNB deems that appropriate relay equipment and the remote terminal belong to different eNBs, the eNB (a receiving eNB, i.e. a source eNB) may first execute a procedure of handover between the eNBs, that is, handing the remote terminal over to an eNB (a target eNB) of the selected relay equipment or an eNB (a target eNB) of relay equipment deemed by the eNB to be appropriate, and based on the above information received from the source eNB, the target eNB notifies the remote terminal of the relay equipment selected for it, or based on the above information received from the source eNB, the target eNB selects appropriate relay equipment for the remote terminal and notifies it to the remote terminal.

In this implementation, as described above, the eNB may also complete the above handover by transmitting a handover request message to the target eNB. The handover request message may include the relay information reported by the remote terminal, and alternatively, it may only include the relay selected by the eNB for the remote terminal, and may further include a new cause, which is used to denote that a cause of the handover is because the selected relay equipment is in the target eNB. In this implementation, the new cause may be relay selection, or relay reselection, or other expressions denoting the cause.

In a further implementation of this embodiment, corresponding to the scenario shown in FIG. 9, what is received by the eNB is relay information forwarded by the serving relay of the remote terminal. In this implementation, the relay information includes an ID of relay equipment reselected by the remote terminal and an ID of the serving cell of the reselected relay equipment.

In this implementation, if the relay equipment reselected by the remote terminal and the serving relay of the remote terminal belong to the same serving cell, the eNB may feed back acknowledgment information to the remote terminal via the serving relay of the remote terminal, so as to confirm the relay equipment selected by the remote terminal.

In this implementation, if the relay equipment reselected by the remote terminal and the serving relay of the remote terminal belong to the same eNB but does not belong to the same serving cell, the eNB may first execute path switch procedure for downlink data within the eNB, that is, switching downlink data related to the remote terminal from the serving relay (such the relay 1 shown in FIG. 9) to the reselected relay equipment (such the relay 2 shown in FIG. 9), and then feed back acknowledgment information to the remote terminal via the serving relay, so as to confirm the relay equipment reselected by the remote terminal.

In this implementation, if the relay equipment reselected by the remote terminal and the serving relay of the remote terminal belong to different eNBs, the eNB may first execute path switch procedure for downlink data between the eNBs, that is, switching downlink data related to the remote terminal from the serving relay (such the relay 1 shown in FIG. 9) to the reselected relay equipment (such the relay 2 shown in FIG. 9), and then transmit the above relay information reported by the remote terminal to the eNB (a target eNB) of the reselected relay equipment. Therefore, the target eNB may feed back acknowledgment information to the remote terminal via the serving relay (such the relay 1 shown in FIG. 9) of the remote terminal, so as to confim the relay equipment reselected by the remote terminal.

With the method of this embodiment, the remote terminal may select appropriate relay, and the eNB may perform necessary configuration for the remote terminal or perform path switching of downlink data according to the serving cell of the selected relay equipment.

Embodiment 4

The embodiment of this disclosure provides a relay selection apparatus, applicable to relay equipment. As principles of the apparatus for solving problems are similar to that of the method of Embodiment 1, the implementation of the method of Embodiment 1 may be referred to for implementation of the apparatus, with identical contents being not going to be described herein any further.

Figure 11:
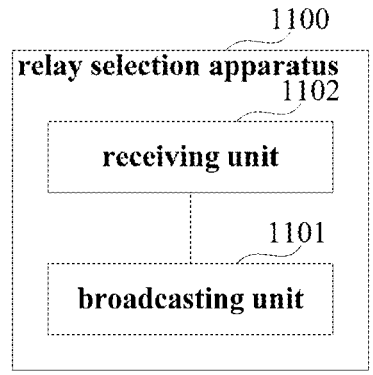
FIG. 11 is a schematic diagram of a structure of a relay selection apparatus of Embodiment 4.

FIG. 11 is a schematic diagram of a structure of the relay selection apparatus. Referring to FIG. 11, the apparatus 1100 includes: a broadcasting unit 1101 configured to broadcast relay discovery information, the relay discovery information including identifier information (a relay UE ID) of the relay equipment and identifier information (a cell ID) of a serving cell of the relay equipment.

In one implementation, the apparatus 1100 may further include:

a receiving unit 1102 configured to receive relay request information transmitted by a remote terminal; and the broadcasting unit 1101 broadcasts the relay discovery information after the receiving unit 1102 receives the relay request information.

With the apparatus of this embodiment, after being triggered to perform relay reselection or selection, the remote terminal may start to receive the above relay discovery information, and further discover near relay equipment. As the relay discovery information contains the identifier of the serving cell of the relay equipment, it is advantageous for the eNB to perform necessary configuration for the remote terminal or perform path switching of downlink data.

Embodiment 5

The embodiment of this disclosure provides a relay selection apparatus, applicable to a remote terminal. As principles of the apparatus for solving problems are similar to that of the method of Embodiment 2, the implementation of the method of Embodiment 2 may be referred to for implementation of the apparatus, with identical contents being not going to be described herein any further.

Figure 12:
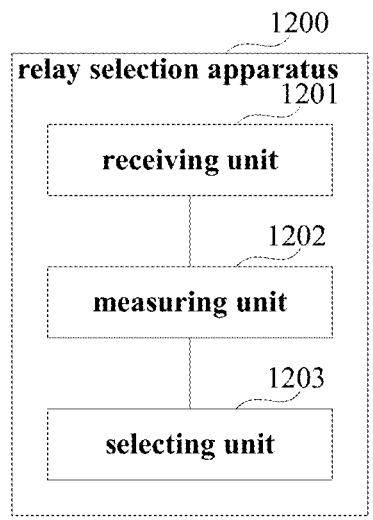
FIG. 12 is a schematic diagram of a structure of a relay selection apparatus of Embodiment 5.

FIG. 12 is a schematic diagram of a structure of the relay selection apparatus. Referring to FIG. 12, the apparatus 1200 includes: a receiving unit 1201, a measuring unit 1202 and a selecting unit 1203; wherein, the receiving unit 1201 is configured to receive relay discovery information transmitted by relay equipment, the relay discovery information including identifier information relay UE IDs) of the relay equipment and identifier information (cell IDs) of serving cells of the relay equipment;

the measuring unit 1202 is configured to measure sidelink channel quality for discovered relay equipment;

and the selecting unit 1203 is configured to determine relay equipment of the remote terminal based on a measurement result.

Figure 13:
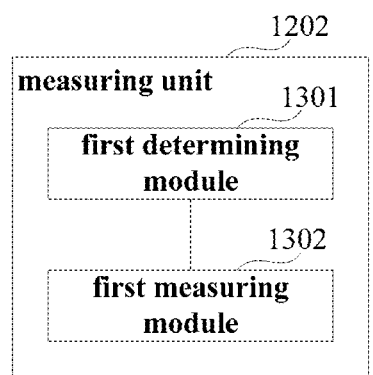
FIG. 13 is a schematic diagram of a structure of an implementation of a measuring unit in FIG. 12.

In one implementation, for a remote terminal in coverage of a cell, as shown in FIG. 13, the measuring unit 1202 includes a first determining module 1301 and a first measuring module 1302. The first determining module 1301 is configured to determine relay equipment in the same serving cell as the remote terminal according to the identifier information of the serving cells of the relay equipment, and the first measuring module 1302 is configured to measure sidelink channel quality for the relay equipment which are in the same serving cell as the remote terminal.

Figure 14:
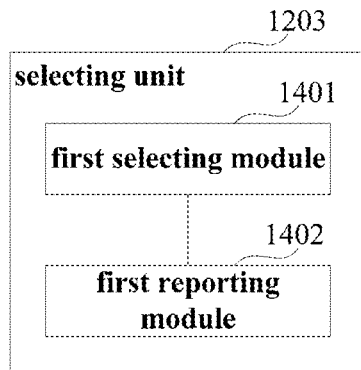
FIG. 14 is a schematic diagram of a structure of an implementation of a selecting unit in the implementation in FIG. 13.

In this implementation, as shown in FIG. 14, the selecting unit 1203 may include a first selecting module 1401 and a first reporting module 1402. The first selecting module 1401 is configured to select one relay equipment as relay equipment of the remote terminal based on a measurement result of the first measuring module 1302, and the first reporting module 1402 is configured to transmit relay information of the relay equipment selected by the first selecting module 1401 to an eNB; wherein, the relay information includes an ID of the selected relay equipment.

Figure 15:
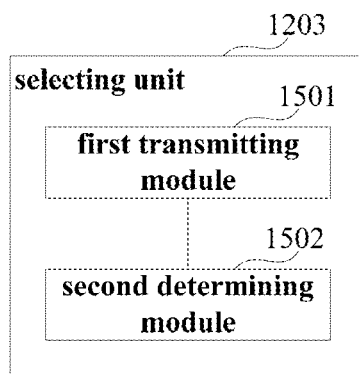
FIG. 15 is a schematic diagram of a structure of another implementation of the selecting unit in the implementation in FIG. 13.

In this implementation, as shown in FIG. 15, the selecting unit 1203 may also include a first transmitting module 1501 and a second determining module 1502. The first transmitting module 1501 is configured to transmit the relay information of the relay equipment which are in the same serving cell as the remote terminal to the eNB; wherein, the relay information includes IDs of the relay equipment which are in the same serving cell as the remote terminal and a measurement result; and the second determining module 1502 is configured to determine relay equipment selected by the eNB for the remote terminal as the relay equipment of the remote terminal.

Figure 16:
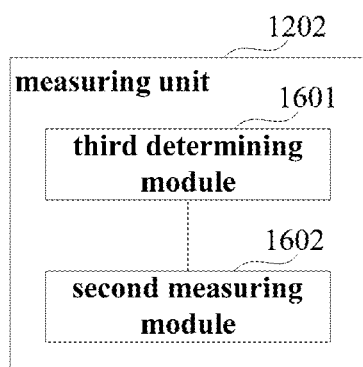
FIG. 16 is a schematic diagram of a structure of another implementation of the measuring unit in FIG. 12.

In another implementation, for remote terminal out of the coverage of the cell, as shown in FIG. 16, the measuring unit 1202 includes a third determining module 1601 and a second measuring module 1602. The third determining module 1601 is configured to determine relay equipment which are in the same serving cell as a serving relay of the remote terminal according to the identifier information of the serving cells of the relay equipment, and the second measuring module 1602 is configured to measure sidelink channel quality for the relay equipment which are in the same serving cell as the serving relay of the remote terminal.

Figure 17:
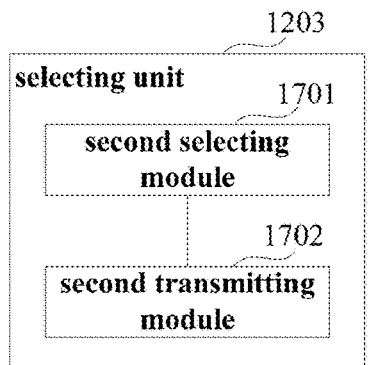
FIG. 17 is a schematic diagram of a structure of an implementation of the selecting unit in the implementation in FIG. 16.

In this implementation, as shown in FIG. 17, the selecting unit 1203 may include a second selecting module 1701 and a second transmitting module 1702. The second selecting module 1701 is configured to select one relay equipment as the relay equipment of the remote terminal based on a measurement result of the second measuring module 1602, and the second transmitting module 1702 is configured to transmit relay information of the relay equipment selected by the second selecting module 1701 to the eNB via the serving relay; wherein, the relay information includes an ID of the selected relay equipment.

Figure 18:
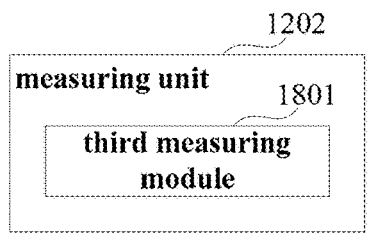
FIG. 18 is a schematic diagram of a structure of a further implementation of the measuring unit in FIG. 12.

In another implementation, as shown in FIG. 18, the measuring unit 1202 includes a third measuring module 1801 configured to measure sidelink channel quality for all discovered relay equipment.

Figure 19:
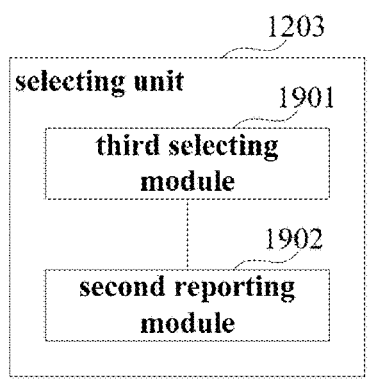
FIG. 19 is a schematic diagram of a structure of an implementation of the selecting unit in the implementation in FIG. 18.

In this implementation, for the remote terminal in the coverage of the cell, as shown in FIG. 19, the selecting unit 1203 may include a third selecting module 1901 and a second reporting module 1902. The third selecting module 1901 is configured to select one relay equipment as the relay equipment of the remote terminal based on a measurement result of the third measuring module 1801, and the second reporting module 1902 is configured to transmit relay information of the selected relay equipment to the eNB; wherein, the relay information includes the ID of the selected relay equipment and an ID of the serving cell of the selected relay equipment.

Figure 20:
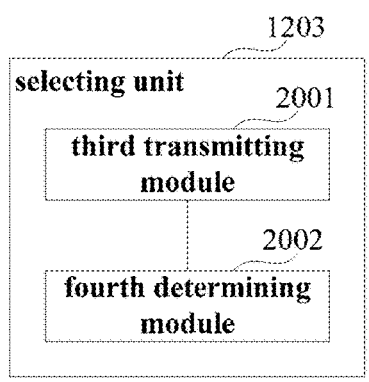
FIG. 20 is a schematic diagram of a structure of another implementation of the selecting unit in the implementation in FIG. 18.

In this implementation, for the remote terminal in the coverage of the cell, as shown in FIG. 20, the selecting unit 1203 may include a third transmitting module 2001 and a fourth determining module 2002. The third transmitting module 2001 is configured to transmit the relay information of the relay equipment to the eNB; wherein, the relay information includes IDs of the relay equipment, a measurement result of the relay equipment and IDs of the serving cells of the relay equipment; and the fourth determining module 2002 is configured to determine relay equipment selected by the eNB for the remote terminal as the relay equipment of the remote terminal.

Figure 21:
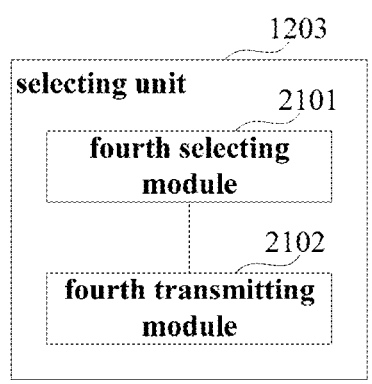
FIG. 21 is a schematic diagram of a structure of a further implementation of the selecting unit in the implementation in FIG. 18.

In this implementation, for the remote terminal out of the coverage of the cell, as shown in FIG. 21, the selecting unit 1203 may include a fourth selecting module 2101 and a fourth transmitting module 2102. The fourth selecting module 2101 is configured to select one relay equipment as the relay equipment of the remote terminal based on a measurement result of the third measuring module 1801, and the fourth transmitting module 2102 is configured to transmit relay information of the selected relay equipment to the serving relay of the remote terminal, and transmit relay information of the selected relay equipment to the eNB via the serving relay, the relay information including an ID of the relay equipment and the ID of the serving cell of the relay equipment.

With the apparatus of this embodiment, the remote terminal may select an appropriate relay, and the eNB may perform necessary configuration for the remote terminal or perform path switching of downlink data according to the serving cell of the selected relay equipment.

Embodiment 6

The embodiment of this disclosure provides a relay selection apparatus, applicable to an eNB. As principles of the apparatus for solving problems are similar to that of the method of Embodiment 3, the implementation of the method of Embodiment 3 may be referred to for implementation of the apparatus, with identical contents being not going to be described herein any further.

Figure 22:
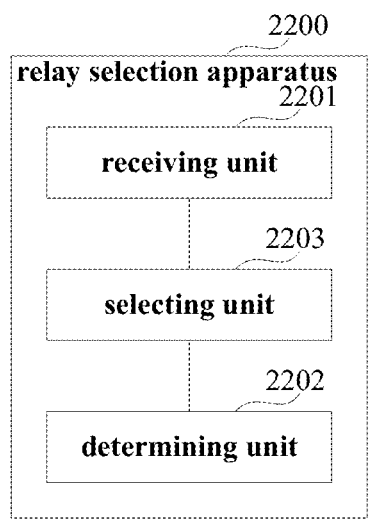
FIG. 22 is a schematic diagram of a structure of a relay selection apparatus of Embodiment 6.

FIG. 22 is a schematic diagram of a structure of the relay selection apparatus. Referring to FIG. 22, the apparatus 2200 includes: a receiving unit 2201 and a determining unit 2202; wherein, the receiving unit 2201 is configured to receive relay information transmitted by a remote terminal, the relay information including an ID of a serving cell of relay equipment discovered by the remote terminal;

and the determining unit 2202 is configured to determine relay equipment of the remote terminal according to the relay information received by the receiving unit 2201.

In one implementation, the relay information includes an ID of relay equipment selected by the remote terminal from discovered relay equipment and an ID of a serving cell of the selected relay equipment.

In this implementation, the determining unit 2202 may feed back acknowledgment information to the remote terminal when the selected relay equipment and the remote terminal belong to the same serving cell, hand the remote terminal over to a serving cell of the selected relay equipment when the selected relay equipment and the remote terminal belong to the same eNB but does not belong to the same serving cell, and feed back acknowledgment information to the remote terminal, and transmit a handover request message to an eNB of the selected relay equipment when the selected relay equipment and the remote terminal belong to different eNBs, so as to hand the remote terminal over to the eNB of the selected relay equipment; wherein, the handover request message includes: the relay information reported by the remote terminal and a cause of handover.

In another implementation, the relay information includes: IDs of the relay equipment discovered by the remote terminal, a measurement result of the discovered relay equipment and IDs of serving cells of the discovered relay equipment.

In this implementation, as shown in FIG. 22, the apparatus further includes:

a selecting unit 2203 configured to select relay equipment for the remote terminal from the relay equipment discovered by the remote terminal according to the relay information.

In this implementation, the determining unit 2202 may notify the remote terminal of the relay information of the relay equipment selected for the remote terminal when the relay equipment selected by the selecting unit 2203 and the remote terminal belong to the same serving cell, hand the remote terminal over to a serving cell of the selected relay equipment when the relay equipment selected by the selecting unit 2203 and the remote terminal belong to the same eNB but does not belong to the same serving cell, and notify the remote terminal of the relay information of the relay equipment selected for the remote terminal, and transmit a handover request message to an eNB of the selected relay equipment when the relay equipment selected by the selecting unit 2203 and the remote terminal belong to different eNBs, so as to hand the remote terminal over to the eNB of the selected relay equipment; wherein, the handover request message includes: the relay information reported by the remote terminal and a cause of handover.

In another implementation, the above relay information received by the receiving unit 2201 transmitted by the remote terminal is forwarded via a serving relay of the remote terminal, and in this implementation, the relay information includes: an ID of relay equipment reselected by the remote terminal and an ID of a serving cell of the relay equipment.

In this implementation, the determining unit 2202 feeds back acknowledgment information to the remote terminal via the serving relay when the reselected relay equipment and the serving cell of the remote terminal belong to the same serving cell, transfers data related to the remote terminal from the serving relay to the reselected relay equipment when the reselected relay equipment and the serving cell of the remote terminal belong to the same eNB but does not belong to the same serving cell, and feeds back acknowledgment information to the remote terminal via the serving relay, and transfers the data related to the remote terminal from the serving relay to the reselected relay equipment when the reselected relay equipment and the serving relay of the remote terminal belong to different eNBs, and transmits the relay information to an eNB of the reselected relay equipment.

With the apparatus of this embodiment, the remote terminal may select an appropriate relay, and the eNB may perform necessary configuration for the remote terminal or perform path switching of downlink data according to the serving cell of the selected relay equipment.

Embodiment 7

The embodiment of this disclosure provides relay equipment, which may be a terminal equipment (UE) in coverage of a cell; wherein, the relay equipment includes the relay selection apparatus described in Embodiment 4.

Figure 23:
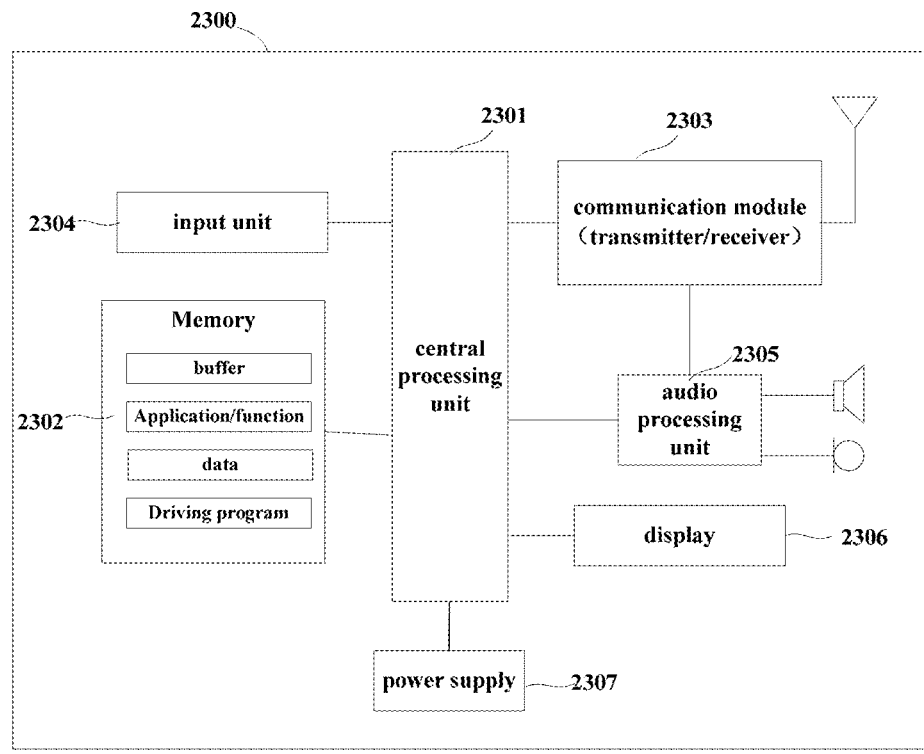
FIG. 23 is a schematic diagram of a hardware structure of relay equipment of Embodiment 7.

FIG. 23 is a schematic diagram of a structure of the relay equipment of the embodiment of this disclosure. As shown in FIG. 23, the relay equipment 2300 may include a central processing unit 2301 and a memory 2302, the memory 2302 being coupled to the central processing unit 2301. It should be noted that this figure is illustrative only, and other types of structures may also be used, so as to supplement or replace this structure and achieve a telecommunications function or other functions.

In one implementation, the functions of the relay selection apparatus may be integrated into the central processing unit 2301, and the central processing unit 2301 executes the functions of the relay selection apparatus described in Embodiment 4, the functions of the relay selection apparatus being incorporated herein, which shall not be described herein any further.

In another implementation, the relay selection apparatus and the central processing unit 2301 may be configured separately. For example, the relay selection apparatus may be configured as a chip connected to the central processing unit 2301, with its functions being realized under control of the central processing unit 2301.

As shown in FIG. 23, the relay equipment 2300 may further include a communication module 2303, an input unit 2304, an audio processing unit 2305, a display 2306 and a power supply 2307. It should be noted that the relay equipment 2300 does not necessarily include all the parts shown in FIG. 23, and furthermore, the relay equipment 2300 may include parts not shown in FIG. 23, and the prior art may be referred to.

As shown in FIG. 23, the central processing unit 2301 is sometimes referred to as a controller or control, and may include a microprocessor or other processor devices and/or logic devices. The central processing unit 2301 receives input and controls operations of every components of the relay equipment 2300.

In this embodiment, the memory 2302 may be, for example, one or more of a buffer memory, a flash memory, a hard drive, a mobile medium, a volatile memory, a nonvolatile memory, or other suitable devices, which may store various information, and may further store a program executing related information. And the central processing unit 2301 may execute the program stored in the memory 2302, so as to realize information storage or processing, etc. Functions of other parts are similar to those of the prior art, which shall not be described herein any further. The parts of the relay equipment 2300 may be realized by specific hardware, firmware, software, or any combination thereof, without departing from the scope of the present disclosure.

With the relay equipment of this embodiment, the remote terminal may select an appropriate relay, and the eNB may perform necessary configuration for the remote terminal or perform path switching of downlink data according to the serving cell of the selected relay equipment.

Embodiment 8

The embodiment of this disclosure further provides a remote terminal, which may be in coverage of a cell, or may be out of the coverage of the cell; wherein, the remote terminal includes the relay selection apparatus described in Embodiment 5.

Figure 24:
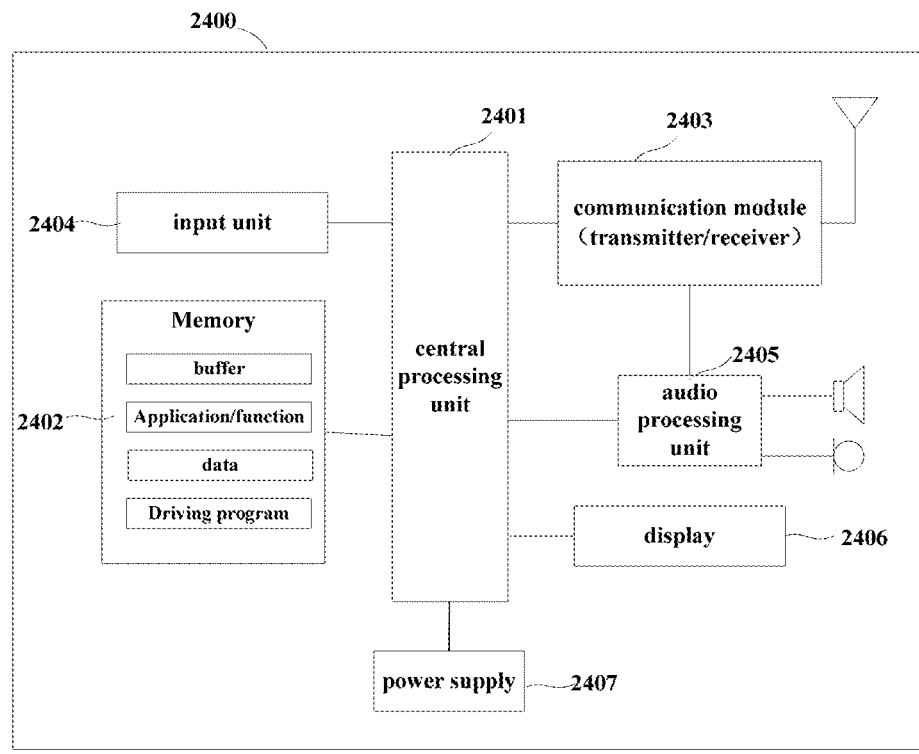
FIG. 24 is a schematic diagram of a hardware structure of a remote terminal of Embodiment 8.

FIG. 24 is a schematic diagram of a structure of the remote terminal of the embodiment of this disclosure. As shown in FIG. 24, the remote terminal 2400 may include a central processing unit 2401 and a memory 2402, the memory 2402 being coupled to the central processing unit 2401. It should be noted that this figure is illustrative only, and other types of structures may also be used, so as to supplement or replace this structure and achieve a telecommunications function or other functions.

In one implementation, the functions of the relay selection apparatus may be integrated into the central processing unit 2401, and the central processing unit 2401 executes the functions of the relay selection apparatus described in Embodiment 5, the functions of the relay selection apparatus being incorporated herein, which shall not be described herein any further.

In another implementation, the relay selection apparatus and the central processing unit 2401 may be configured separately. For example, the relay selection apparatus may be configured as a chip connected to the central processing unit 2401, with its functions being realized under control of the central processing unit 2401.

As shown in FIG. 24, the remote terminal 2400 may further include a communication module 2403, an input unit 2404, an audio processing unit 2405, a display 2406 and a power supply 2407. It should be noted that the remote terminal 2400 does not necessarily include all the parts shown in FIG. 24, and furthermore, the remote terminal 2400 may include parts not shown in FIG. 24, and the prior art may be referred to.

As shown in FIG. 24, the central processing unit 2401 is sometimes referred to as a controller or control, and may include a microprocessor or other processor devices and/or logic devices. The central processing unit 2401 receives input and controls operations of every components of the remote terminal 2400.

In this embodiment, the memory 2402 may be, for example, one or more of a buffer memory, a flash memory, a hard drive, a mobile medium, a volatile memory, a nonvolatile memory, or other suitable devices, which may store various information, and may further store a program executing related information. And the central processing unit 2401 may execute the program stored in the memory 2402, so as to realize information storage or processing, etc. Functions of other parts are similar to those of the prior art, which shall not be described herein any further. The parts of the remote terminal 2400 may be realized by specific hardware, firmware, software, or any combination thereof, without departing from the scope of the present disclosure.

With the relay equipment of this embodiment, the remote terminal may select an appropriate relay, and the eNB may perform necessary configuration for the remote terminal or perform path switching of downlink data according to the serving cell of the selected relay equipment.

Embodiment 9

The embodiment of this disclosure provides an eNB, including the relay selection apparatus described in Embodiment 6.

Figure 25:
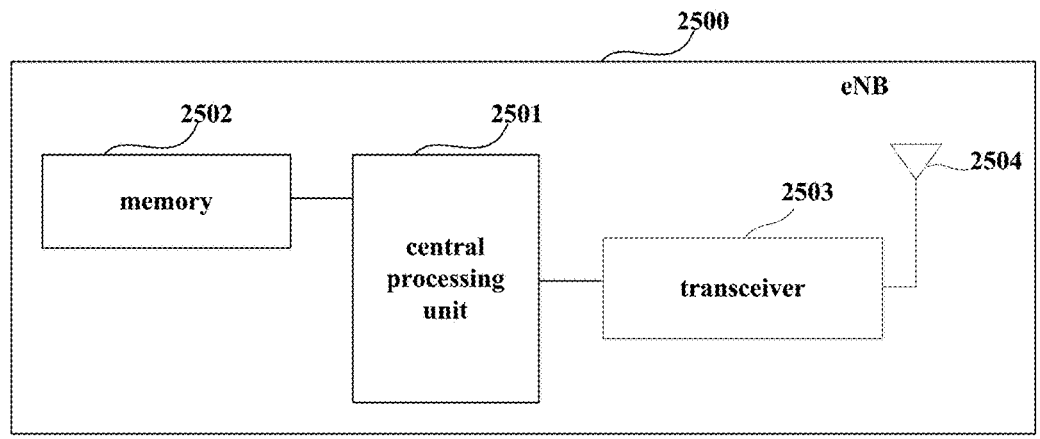
FIG. 25 is a schematic diagram of a hardware structure of an eNB of Embodiment 9.

FIG. 25 is a schematic diagram of a structure of the eNB of the embodiment of this disclosure. As shown in FIG. 25, the eNB 2500 may include a central processing unit (CPU) 2501 and a memory 2502, the memory 2502 being coupled to the central processing unit 2501. In this embodiment, the memory 2502 may store various data, and furthermore, it may store a program for information processing, and execute the program under control of the central processing unit 2501, so as to receive various information transmitted by relay equipment or a remote terminal, and transmit various information to the relay equipment or remote terminal.

In one implementation, the functions of the relay selection apparatus may be integrated into the central processing unit 2501.

In another implementation, the relay selection apparatus and the central processing unit 2501 may be configured separately. For example, the relay selection apparatus may be configured as a chip connected to the central processing unit 2501, with its functions being realized under control of the central processing unit 2501.

Furthermore, as shown in FIG. 25, the eNB 2500 may include a transceiver 2503, and an antenna 2504, etc. In this embodiment, functions of the above components are similar to those in the prior art, and shall not be described herein any further. It should be noted that the eNB 2500 does not necessarily include all the parts shown in FIG. 25, and furthermore, the eNB 2500 may include parts not shown in FIG. 25, and the prior art may be referred to.

With the relay equipment of this embodiment, the remote terminal may select an appropriate relay, and the eNB may perform necessary configuration for the remote terminal or perform path switching of downlink data according to the serving cell of the selected relay equipment.

Embodiment 10

The embodiment of this disclosure provides a communication system, including the relay equipment described in Embodiment 7, the remote terminal described in Embodiment 8 and the eNB described in Embodiment 9.

Figure 26:
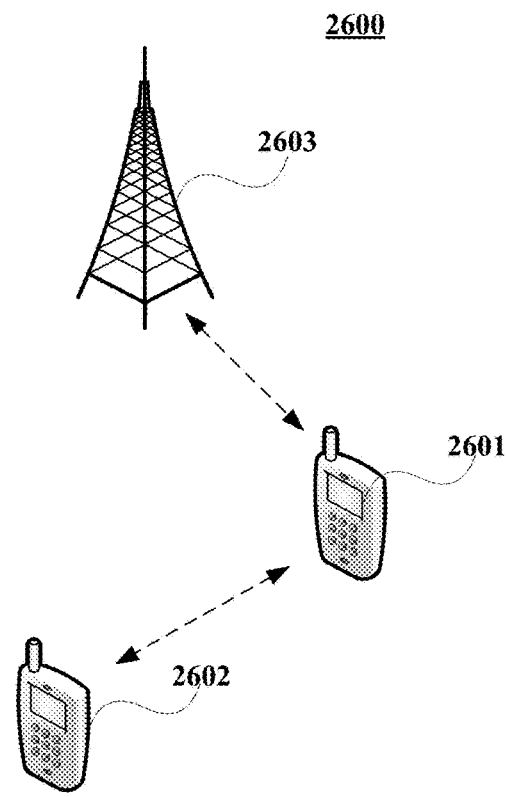
FIG. 26 is a schematic diagram of a topology of a communication system of Embodiment 10.

FIG. 26 is a schematic diagram of a structure of the communication system of the embodiment of this disclosure. As shown in FIG. 26, the communication system 2600 includes: relay equipment 2601, a remote terminal 2602 and an eNB 2603; wherein, the relay equipment 2601 may be one or more, which is in coverage of the eNB 2603, and may be implemented by the relay equipment in Embodiment 7, the contents of which being incorporated herein, which shall not be described herein any further.

The remote terminal 2602 may be one or more, which is in the coverage of the eNB 2603, or may be out of the coverage of the eNB 2603, and may be implemented by the remote terminal in Embodiment 8, the contents of which being incorporated herein, which shall not be described herein any further.

The eNB 2603 may be implemented by the eNB in Embodiment 9, the contents of which being incorporated herein, which shall not be described herein any further.

With the relay equipment of this embodiment, the remote terminal may select an appropriate relay, and the eNB may perform necessary configuration for the remote terminal or perform path switching of downlink data according to the serving cell of the selected relay equipment.

An embodiment of the present disclosure further provides a computer readable program code, which, when executed in a relay selection apparatus or relay equipment, will cause a computer unit to carry out the relay selection method described in Embodiment 1 in the relay selection apparatus or relay equipment.

An embodiment of the present disclosure further provides a computer readable medium, including a computer readable program code, which will cause a computer unit to carry out the relay selection method described in Embodiment 1 in a relay selection apparatus or relay equipment.

An embodiment of the present disclosure further provides a computer readable program code, which, when executed in a relay selection apparatus or remote terminal, will cause a computer unit to carry out the relay selection method described in Embodiment 2 in the relay selection apparatus or remote terminal.

An embodiment of the present disclosure further provides a computer readable medium, including a computer readable program code, which will cause a computer unit to carry out the relay selection method described in Embodiment 2 in a relay selection apparatus or remote terminal.

An embodiment of the present disclosure further provides a computer readable program code, which, when executed in a relay selection apparatus or an eNB, will cause a computer unit to carry out the relay selection method described in Embodiment 3 in the relay selection apparatus or eNB.

An embodiment of the present disclosure further provides a computer readable medium, including a computer readable program code, which will cause a computer unit to carry out the relay selection method described in Embodiment 3 in a relay selection apparatus or an eNB.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principles of the present disclosure, and such variants and modifications fall within the scope of the present disclosure.

What is claimed is:

1. A relay selection apparatus, applicable to relay equipment, the apparatus comprising:
   a broadcasting unit configured to broadcast relay discovery information, the relay discovery information comprising identifier information (a relay UE ID) of the relay equipment and identifier information (a cell ID) of a serving cell of the relay equipment;
   the identifier information is used for a remote terminal to determine a relay equipment which is in the same serving cell as the remote terminal and to measure sidelink channel quality for a discovered relay equipment which are in the same serving cell as the remote terminal.

2. A relay selection apparatus, applicable to a remote terminal, the apparatus comprising:
   a receiving unit configured to receive relay discovery information transmitted by relay equipment, the relay discovery information comprising identifier information (relay UE IDs) of the relay equipment and identifier information (cell IDs) of serving cells of the relay equipment;
   a measuring unit configured to measure sidelink channel quality for discovered relay equipment; and
   a selecting unit configured to determine relay equipment of the remote terminal based on a measurement results;
   wherein the measuring unit comprises:
   a first determining module configured to determine relay equipment in the same serving cell as the remote terminal according to the identifier information of the serving cells of the relay equipment; and
   a first measuring module configured to measure sidelink channel quality for the discovered relay equipment which are in the same serving cell as the remote terminal.

3. The apparatus according to claim 2, wherein the selecting unit comprises:
   a first selecting module configured to select relay equipment as relay equipment of the remote terminal based on a measurement result of the first measuring module; and
   a first reporting module configured to transmit relay information of the selected relay equipment to an eNB; wherein, the relay information comprises an ID of the selected relay equipment.

4. The apparatus according to claim 2, wherein the selecting unit comprises:
   a first transmitting module configured to transmit the relay information of the relay equipment which are in the same serving cell as the remote terminal to the eNB; wherein, the relay information comprises IDs of the relay equipment which are in the same serving cell as the remote terminal and a measurement result; and
   a second determining module configured to determine relay equipment selected by the eNB for the remote equipment as the relay equipment of the remote terminal.

5. The apparatus according to claim 2, wherein the measuring unit comprises:
   a third determining module configured to determine relay equipment which are in the same serving cell as a serving relay of the remote terminal according to the identifier information of the serving cells of the relay equipment; and
   a second measuring module configured to sidelink measure channel quality for the relay equipment which are in the same serving cell as the serving relay of the remote terminal.

6. The apparatus according to claim 5, wherein the selecting unit comprises:
   a second selecting module configured to select relay equipment as the relay equipment of the remote terminal based on a measurement result of the second measuring module; and a second transmitting module configured to transmit relay information of the relay equipment selected by the second selecting module to the eNB via the serving relay; wherein, the relay information comprises an ID of the selected relay equipment.

7. The apparatus according to claim 2, wherein the measuring unit comprises:
a third measuring module configured to measure sidelink channel quality for all discovered relay equipment.

8. The apparatus according to claim 7, wherein the selecting unit comprises:
a third selecting module configured to select relay equipment as the relay equipment of the remote terminal based on a measurement result of the third measuring module; and
a second reporting module configured to transmit relay information of the selected relay equipment to the eNB; wherein, the relay information comprises the ID of the selected relay equipment and an ID of the serving cell of the relay equipment.

9. The apparatus according to claim 7, wherein the selecting unit comprises:
a third transmitting module configured to transmit the relay information of the relay equipment to the eNB; wherein, the relay information comprises IDs of the relay equipment, a measurement result of the relay equipment and the IDs of the serving cells of the relay equipment; and
a fourth determining module configured to determine relay equipment selected by the eNB for the remote terminal as the relay equipment of the remote terminal.

10. The apparatus according to claim 7, wherein the selecting unit comprises:
a fourth selecting module configured to select relay equipment as the relay equipment of the remote terminal based on a measurement result of the third measuring module; and
a fourth transmitting module configured to transmit relay information of the selected relay equipment to a serving relay of the remote terminal, and transmit the relay information of the selected relay equipment to the eNB via the serving relay, the relay information comprising an ID of the selected relay equipment and the ID of the serving cell of the selected relay equipment.

11. A relay selection apparatus, applicable to an eNB, the apparatus comprising:
a receiving unit configured to receive relay information transmitted by a remote terminal, the relay information comprising an ID of a serving cell of relay equipment discovered by the remote terminal; and
a determining unit configured to determine relay equipment of the remote terminal according to the relay information received by the receiving unit.

12. The apparatus according to claim 11, wherein the relay information comprises: an ID of relay equipment selected by the remote terminal from discovered relay equipment and an ID of a serving cell of the selected relay equipment.

13. The apparatus according to claim 12, wherein,
the determining unit feeds back acknowledgment information to the remote terminal when the selected relay equipment and the remote terminal belong to the same serving cell;
the determining unit hands the remote terminal over to the serving cell of the selected relay equipment when the selected relay equipment and the remote terminal belong to the same eNB but does not belong to the same serving cell, and feeds back acknowledgment information to the remote terminal;
and the determining unit transmits a handover request message to an eNB of the selected relay equipment when the selected relay equipment and the remote terminal belong to different eNBs, so as to hand the remote terminal over to the eNB of the selected relay equipment; wherein, the handover request message comprises: the relay information reported by the remote terminal and a cause of handover.

14. The apparatus according to claim 11, wherein the relay information comprises: IDs of relay equipment discovered by the remote terminal, a measurement result of the discovered relay equipment and IDs of serving cells of the discovered relay equipment.

15. The apparatus according to claim 14, wherein the apparatus further comprises:
a selecting unit configured to select relay equipment for the remote terminal from the relay equipment discovered by the remote terminal according to the relay information.

16. The apparatus according to claim 15, wherein,
the determining unit notifies the remote terminal of the relay information of the relay equipment selected for the remote terminal when the relay equipment selected by the selecting unit and the remote terminal belong to the same serving cell;
the determining unit hands the remote terminal over to a serving cell of the selected relay equipment when the relay equipment selected by the selecting unit and the remote terminal belong to the same eNB but does not belong to the same serving cell, and notifies the remote terminal of the relay information of the relay equipment selected for the remote terminal;
and the determining unit transmits a handover request message to an eNB of the selected relay equipment when the relay equipment selected by the selecting unit and the remote terminal belong to different eNBs, so as to hand the remote terminal over to the eNB of the selected relay equipment; the handover request message comprises: the relay information reported by the remote terminal and a cause of handover.

17. The apparatus according to claim 11, wherein the receiving unit receives relay information forwarded by a serving relay of the remote terminal, the relay information comprising: an ID of relay equipment reselected by the remote terminal and an ID of a serving cell of the relay equipment.

18. The apparatus according to claim 17, wherein,
the determining unit feeds back acknowledgment information to the remote terminal via the serving relay when the reselected relay equipment and the serving cell of the remote terminal belong to the same serving cell;
the determining unit transfers data related to the remote terminal from the serving relay to the reselected relay equipment and feeds back acknowledgment information to the remote terminal via the serving relay when the reselected relay equipment and the serving relay of the remote terminal belong to the same eNB but does not belong to the same serving cell;
and the determining unit transfers the data related to the remote terminal from the serving relay to the reselected relay equipment and transmits the relay information to the eNB of the reselected relay equipment when the reselected relay equipment and the serving relay of the remote terminal belong to different eNBs.

* * * * *